(12) United States Patent
Lin et al.

(10) Patent No.: US 9,329,686 B2
(45) Date of Patent: May 3, 2016

(54) HAPTIC FEEDBACK METHOD, HAPTIC FEEDBACK APPARATUS, ELECTRONIC DEVICE AND STYLUS

(71) Applicant: Lenovo (Beijing) Co., Ltd., Beijing (CN)

(72) Inventors: Nan Lin, Beijing (CN); Jianfeng Hu, Beijing (CN); Rongbin Xiao, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 90 days.

(21) Appl. No.: 14/136,878

(22) Filed: Dec. 20, 2013

(65) Prior Publication Data

US 2014/0176472 A1 Jun. 26, 2014

(30) Foreign Application Priority Data

Dec. 26, 2012 (CN) .......................... 2012 1 0576732

(51) Int. Cl.
*G06F 3/01* (2006.01)
*G06F 3/0354* (2013.01)
*G06F 3/041* (2006.01)

(52) U.S. Cl.
CPC ............ *G06F 3/016* (2013.01); *G06F 3/03545* (2013.01); *G06F 3/041* (2013.01)

(58) Field of Classification Search
CPC ...... G06F 3/016; G06F 3/03545; G06F 3/041
USPC .................................................... 345/156, 173
See application file for complete search history.

(56) References Cited

U.S. PATENT DOCUMENTS

| 2005/0116940 A1* | 6/2005 | Dawson ......................... 345/179 |
| 2008/0143693 A1* | 6/2008 | Schena ......................... 345/179 |
| 2009/0189749 A1* | 7/2009 | Salada ........................ 340/407.2 |
| 2010/0231550 A1* | 9/2010 | Cruz-Hernandez et al. .. 345/174 |
| 2011/0102349 A1* | 5/2011 | Harris ........................... 345/173 |

* cited by examiner

*Primary Examiner* — Viet Pham
(74) *Attorney, Agent, or Firm* — Harness, Dickey & Pierce, P.L.C.

(57) ABSTRACT

The present invention discloses a haptic feedback method, a haptic feedback apparatus, an electronic device and a stylus The haptic feedback method applicable to an electronic device including a touch input unit includes: when an operation is performed on the touch input unit by an operating object, obtaining a first parameter indicating the type of the operating object; determining a feedback parameter of a force feedback unit at least based on the first parameter, wherein the force feedback unit is arranged on the touch input unit or the operating object; and controlling the force feedback unit based on the feedback parameter to generate and output to a user a feedback force corresponding to the type of the operating object.

15 Claims, 3 Drawing Sheets

HAPTIC FEEDBACK METHOD, HAPTIC FEEDBACK APPARATUS, ELECTRONIC DEVICE AND STYLUS

CROSS REFERENCE TO RELATED APPLICATION

This application claims priority to Chinese Patent Application No. 201210576732.6, filed with the Chinese Patent Office on Dec. 26, 2012 and entitled "HAPTIC FEEDBACK METHOD, HAPTIC FEEDBACK APPARATUS, ELECTRONIC DEVICE AND STYLUS", which is hereby incorporated by reference in its entirety.

FIELD OF THE DISCLOSURE

The present invention relates to the field of electronics and in particular to a haptic feedback method, a haptic feedback apparatus, an electronic device and a stylus.

BACKGROUND OF THE DISCLOSURE

In the prior art, a touch input unit is generally provided on an electronic device such as a tablet PC, a mobile phone with a touch screen, etc., and the emergence of the touch input unit enables a user to input as if he or she was actually writing with a pen, thereby addressing the technical problems of troublesome operation and a need to memorize for the input through a keyboard, a mouse, etc., and the problem of too many complex peripherals for the electronic device, and improving the user experience.

However the inventors have identified during making of the invention that although a handwriting input in the prior art is much more convenient than an input by a keyboard, a mouse, etc., the material of a handwriting stylus or a touch input unit is different from a real pen and real paper, so it is impossible for the handwriting input to reach the effect of real writing on the paper with the pen; and in the prior art, the same feedback effect may be given regardless of whether an operation is performed with a finger or a stylus or whether an operation is performed with different types of styluses, so all of them may be identical for the feeling of the user. In summary, the handwriting input in the prior art can not achieve a different feedback effect given in response to a different operating object.

SUMMARY OF THE DISCLOSURE

The invention provides a haptic feedback method, a haptic feedback apparatus, an electronic device and a stylus so as to address the technical problem in the prior art of the impossibility for a handwriting input to have a different feedback effect given in response to a different operating object.

One aspect of the invention provides a haptic feedback method, applicable to an electronic device including a touch input unit, wherein the method includes: when an operation is performed on the touch input unit by an operating object, obtaining a first parameter indicating the type of the operating object; determining a feedback parameter of a force feedback unit at least based on the first parameter, wherein the force feedback unit is arranged on the touch input unit or the operating object; and controlling the force feedback unit based on the feedback parameter to generate and output to a user a feedback force corresponding to the type of the operating object.

Optionally the obtaining a first parameter indicating the type of the operating object includes: obtaining the first parameter by inquiring in the electronic device a value of a flag set by a user.

Optionally the obtaining a first parameter indicating the type of the operating object includes: receiving first identification information transmitted from the operating object; and obtaining the first parameter based on the first identification information.

Optionally the method further include: receiving a modification operation via a user interface; and modifying the first identification information in response to the modification operation.

Optionally the determining a feedback parameter of a force feedback unit at least based on the first parameter includes: determining the feedback parameter of the force feedback unit based on the first parameter and first pressure information which is pressure information generated by the operating object coming into contact with the touch input unit when performing the operation.

Optionally the determining a feedback parameter of a force feedback unit at least based on the first parameter includes: determining the feedback parameter of the force feedback unit based on the first parameter and a second parameter, where the second parameter indicates the type of the touch input unit.

Another aspect of the invention provides a haptic feedback apparatus, applicable to an electronic device including a touch input unit configured to receive an operation on the touch input unit by an operating object, wherein the haptic feedback apparatus includes: a force feedback unit arranged on the touch input unit; a circuit board; a processing unit arranged on the circuit board, configured to obtain a first parameter indicating the type of the operating object upon reception of the operation and to determine a feedback parameter of the force feedback unit at least based on the first parameter; and a control unit arranged on the circuit board, configured to control the force feedback unit based on the feedback parameter to generate and output to a user a feedback force corresponding to the type of the operating object.

Optionally the haptic feedback apparatus further includes a receiving unit connected to the circuit board to receive first identification information transmitted from the operating object; and the processing unit is further configured to obtain the first parameter based on the first identification information.

Optionally the haptic feedback apparatus further includes a pressure sensing means arranged on the touch input unit, configured to obtain first pressure information generated by the operating object on the touch input unit when receiving the operation; and the processing unit is further configured to determine the feedback parameter of the force feedback unit based on the first parameter and the first pressure information.

Optionally the processing unit is further configured to obtain a second parameter indicating the type of the touch input unit and to determine the feedback parameter of the force feedback unit based on the first parameter and the second parameter.

Still another aspect of the invention provides an electronic device including a touch input unit and further including the haptic feedback apparatus in the foregoing technical solution.

A further aspect of the invention provides a stylus configured to control an electronic device by performing an operation on a touch input unit, wherein the stylus includes: a body including a head and a stem; a force feedback unit arranged on the body; a circuit board arranged on the body; a processing unit arranged on the body, configured to obtain a first parameter indicating a type of the stylus when the operation is performed on the touch input unit by the head and to determine a feedback parameter of the force feedback unit at least based on the first parameter; and a control unit arranged on the circuit board, configured to control the force feedback unit based on the feedback parameter to generate and output to a user a feedback force corresponding to the type of the stylus.

Optionally the stylus further includes a pressure sensing means arranged on the body, configured to obtain first pressure information generated by the stylus on the touch input unit when the head performs the operation; and the processing unit is further configured to determine the feedback parameter of the force feedback unit based on the first parameter and the first pressure information.

Optionally the processing unit is further configured to obtain a second parameter transmitted from the electronic device and to determine the feedback parameter of the force feedback unit based on the first parameter and the second parameter, where the second parameter indicates a type of the touch input unit.

Optionally the stylus further includes a switch configured to change the first parameter by changing the status of the switch.

With one or more of the technical solutions in the embodiments of the invention, at least the following technical effects or advantages can be achieved:

In an embodiment of the invention, when an operation is performed on a touch input unit by an operating object, a first parameter indicating the type of the operating object is obtained, and then a feedback parameter of a force feedback unit is determined at least based on the first parameter, where the force feedback unit is arranged on the touch input unit or the operating object; and then the force feedback unit is controlled based on the feedback parameter to generate and output to a user a feedback force corresponding to the type of the operating object. Accordingly, the method in this embodiment can give a different feedback effect in response to the type of the operating object. For example, if the first parameter indicates that the operating object is currently used in a pencil mode, that is, the current type of the operating object is a pencil, then a feedback parameter of the force feedback unit may be determined according to the pencil, and then the force feedback unit may generate and output to the user a feedback effect corresponding to the pencil, and at this time the user may feel as if he or she was writing with a real pencil, thus improving the experience of the user.

Furthermore, in an embodiment of the invention, the feedback parameter of the force feedback unit is determined further based on a second parameter indicating the type of the touch input unit, and with the method in this embodiment, the feedback effect can be determined based on both the type of the operating object and the type of the touch input unit to be like writing on real paper by a real stylus. Hence the method in this embodiment can further improve the experience of the user.

Still furthermore, in an embodiment of the invention, the feedback effect can be further determined based on both pressure information generated by the operating object coming into contact with the touch input unit when performing the operation and the first parameter indicating the type of the operating object, and even with the same type of pen and the same type of paper, it may be felt differently with a varying strength. Accordingly, with the method in this embodiment, the feedback effect can be determined based on both the type of the stylus and the pressure information to thereby further improve the experience of the user.

DETAILED DESCRIPTION

Embodiments of the invention provide a haptic feedback method, a haptic feedback apparatus, an electronic device and a stylus so as to address the technical problem in the prior art of the impossibility for a handwriting input to have a different feedback effect given in response to a different operating object.

In order to address the foregoing technical problem, a general idea of the technical solutions in the embodiments of the invention is as follows:

When an operation is performed on a touch input unit by an operating object, a first parameter indicating the type of the operating object is obtained, and then a feedback parameter of a force feedback unit is determined at least based on the first parameter, where the force feedback unit is arranged on the touch input unit or the operating object; and then the force feedback unit is controlled based on the feedback parameter to generate and output to a user a feedback force corresponding to the type of the operating object, so with the method in this embodiment different feedback effects in response to the type of the operating object may be achieved. For example, if the first parameter indicates that the operating object is currently used in a pencil mode, that is, the current type of the operating object is a pencil, then a feedback parameter of the force feedback unit may be determined according to a pencil, the force feedback unit may generate and output to the user a feedback effect corresponding to the pencil, and at this time the user may feel as if he or she was writing with a real pencil, thus improving the experience of the user.

In order to better understand the foregoing technical solution, the technical solution will be described below in details with reference to the drawings and particular embodiments.

Figure 1:
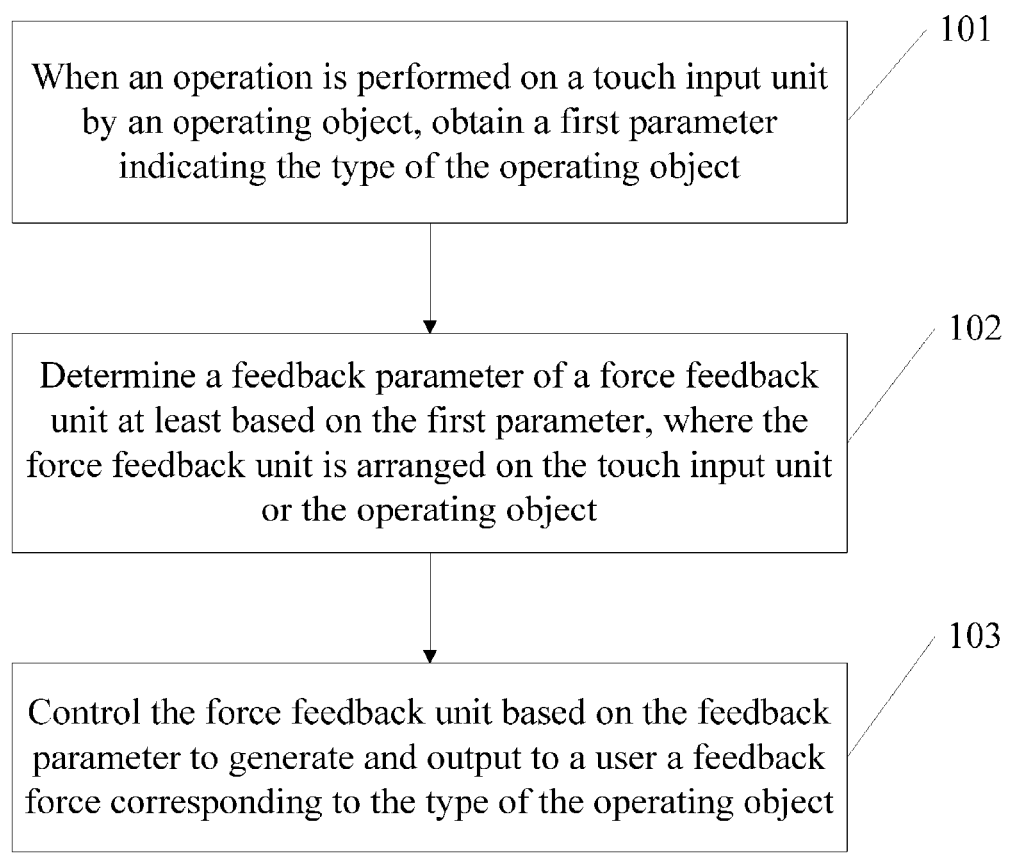
FIG. 1 is a flow chart of a haptic feedback method in an embodiment of the invention.

An embodiment of the invention provides a haptic feedback method applicable to an electronic device, e.g., a mobile phone, a Personal Digital Assistant (PDA) or a tablet PC. The electronic device includes a touch input unit. Next referring to FIG. 1, FIG. 1 is a flow chart of the haptic feedback method in this embodiment, where the method includes:

Step 101: When an operation is performed on a touch input unit by an operating object, a first parameter indicating a type of the operating object is obtained;

Step 102: A feedback parameter of a force feedback unit is determined at least based on the first parameter, where the force feedback unit is arranged on the touch input unit or the operating object; and Step 103: The force feedback unit is controlled based on the feedback parameter to generate and output to a user a feedback force corresponding to the type of the operating object.

An implementation of the haptic feedback method in this embodiment will be described below in details by way of particular examples.

First Embodiment

In this embodiment, it is assumed that the operating object is a finger, the touch input unit is a touch screen, and the electronic device is a smart phone, then when the user performs an operation on the touch screen by the finger, for example, has the finger slid fleetly on the touch screen or clicks an icon of an application by the finger, the step 101 is performed to obtain the first parameter indicating the type of the operating object, that is, a type of the object currently emulated by the finger, e.g., a pencil, a fountain pen or a brush pen.

In this embodiment, no signal or information may be transmitted from the finger to notify the electronic device of the current type of the finger, therefore the first parameter is stored in the electronic device. For example, the currently used type of the operating object may be set by assigning a value to a flag, e.g., 0 indicating a pencil, 1 indicating a fountain pen, and 2 indicating a brush pen; and furthermore a user interface can be provided via which the user can modify the value of the flag. Then the step 101 can be performed by inquiring the value of the flag set by the user on the mobile phone to obtain the first parameter. For example, if the obtained first parameter is 0, it is indicated that the currently set type of the operating object is the pencil.

Then the step 102 is performed, in which a feedback parameter of a force feedback unit is determined based on the first parameter. In this embodiment, the force feedback unit is arranged on the touch input unit. Since the first parameter is 0 indicating that the type of the operating object is the pencil, that is, the pencil is currently emulated by the finger, the principle to set the feedback parameter of the force feedback unit is to set the vibration amplitude and the vibration frequency of the force feedback unit so that the force feedback unit makes rustling sounds.

Then the step 103 is performed, in which the force feedback unit is controlled based on the feedback parameter determined in the step 102, e.g., the vibration amplitude and the vibration frequency, to vibrate at the vibration amplitude and the vibration frequency and generate and output to the user a feedback force corresponding to the pencil. At this time the user may hear rustling and feel as if he or she was writing with the pencil.

The method in this embodiment can give a different feedback effect in response to a different type of the operating object, so as to offer a sense of reality to the user and improve the experience of the user.

Second Embodiment

In this embodiment, the operating object is a stylus, the touch input unit is still a touch screen, and the electronic device is a smart phone. When the user performs an operation on the touch screen by the stylus, for example, performs the same operation as in the first embodiment by the stylus, e.g., has the stylus slid fleetly on the touch screen or clicks an icon of an application by stylus, the step 101 is performed. In this embodiment, the first parameter may be obtained by, in addition to the approach disclosed in the first embodiment, the following steps: receiving first identification information transmitted from the operating object, and obtaining the first parameter based on the first identification information.

In a particular implementation, there is a user interface on the stylus via which the stylus can receive a modification operation, and the first identification information can be modified in response to the modification operation. The user interface can be a graphic interface via which the user can set different values as the identification information; and or the user interface can be a mechanical button with which the value of a flag and accordingly the first identification information can be changed. The first identification information can be the first parameter itself, or the first identification information can have a correspondence relationship with the first parameter, that is, the corresponding first parameter can be obtained based on the first identification information.

Thus when the user operates on the touch screen by using the stylus, the first identification information can be transmitted to the smart phone through a near-field communication unit, and the smart phone can obtain the first parameter by processing, e.g., decoding, the first identification information upon reception of the first identification information. In this embodiment, for example, the obtained first parameter is still 0 indicating that the pencil is currently emulated by the stylus.

After the first parameter is obtained, the step 102 and the step 103 are subsequently performed. In this embodiment, the processes of the step 102 and the step 103 are similar to that of the first embodiment, except that the force feedback unit can be arranged on the touch input unit or can be arranged on the stylus. The description of the other similar processes will be omitted here.

Third Embodiment

In this embodiment, the first parameter indicates the type of the operating object itself instead of the type of the object emulated by the operating object as described in the first embodiment and the second embodiment. For example, the first parameter indicates whether the operating object is a finger or a stylus.

In a particular implementation, in the step 101, for example, with a fingerprint detector arranged on the touch screen, if a fingerprint is detected, then it is indicated that the operating object is a finger or finger-like object, e.g., a glove of rubber. If the operating object is a stylus, then identification information can be transmitted from the stylus to the smart phone; the smart phone in turn judges whether the identification information has been received, and if so, then it is indicated that the operating object is the stylus.

In this embodiment, when the operating object is determined in the step 101 as the finger, then in the step 102, a feedback parameter of the force feedback unit is determined based on the first parameter, particularly by setting the vibration amplitude and the vibration frequency of the force feedback unit such that the determined vibration amplitude and vibration frequency result in a force feedback effect like the sounding of the finger sliding off real paper. In this embodiment, the force feedback unit is arranged on the touch input unit in consideration of universality of the electronic device. Of course, the force feedback unit can alternatively be arranged on both the touch input unit and the stylus.

If the operating object is determined in the step 101 as the stylus, then in the step 102, the determined vibration amplitude and vibration frequency result in a force feedback effect of sounding more dully than the effect for the finger.

Thus the method in this embodiment can give different feedback effects by distinguishing types of the operating object to therefore improve the experience of the user.

In the foregoing three embodiments, the force feedback unit can be a vibration motor or can be an ultrasonic vibration apparatus, and in practice the force feedback unit can alternatively be in another form so long as the force feedback unit has an adjustable vibration effect.

A particular implementation of the haptic feedback method in FIG. 1 has been described above in details in the three embodiments, and additional embodiments of the haptic feedback method in FIG. 1 will be further described below.

In a first case, in the step 102, the feedback parameter of the force feedback unit is determined based on the first parameter and first pressure information, where the first pressure information is pressure information resulting from the operating object coming into contact with the touch input unit when performing the operation, and in this embodiment, the first pressure information can be detected by a pressure sensor arranged on the touch input unit, which may be applicable to both a finger or an electronic stylus. As described in the first embodiment, when the operating object is a finger, the force feedback unit is arranged on the touch input unit, and then the first parameter and the first pressure information are obtained by the electronic device, and the step 102 and the step 103 are performed. When the operating object is a stylus, the first parameter and the first pressure information can be obtained by the electronic device and then transmitted to the stylus, and a feedback force can be generated by the force feedback unit arranged on the stylus; or a pressure sensor can be arranged on the stylus, the first parameter and the first pressure information can be obtained by the stylus, and a feedback parameter of the force feedback unit arranged on the stylus can be determined based on the first parameter and the first pressure information; or the first parameter and the first pressure information can be obtained by the stylus and then transmitted to the electronic device, and a feedback parameter of the force feedback unit arranged on the touch input unit can be determined by the electronic device.

Furthermore, the first pressure information is in the unit of Pascal, and after the first pressure information is obtained, a level of current pressure can be determined based on the pressure information and pressure levels, and a feedback parameter can be determined based on the pressure level and the first parameter.

Continuing with the foregoing particular example, if the first parameter indicates that the pencil is currently emulated by the operating object, and the first pressure information detected by the pressure sensor is a Pascals, for example, at a second pressure level which is a relatively high pressure level, indicating a relative high pressure generated by the operating object on the touch input unit, then the feedback parameter determined at this time may result in duller sounding of vibration; and if the first pressure information indicates that current pressure is at a fifth level, then it is indicated that a lower pressure is generated by the operating object on the touch input unit, and the feedback parameter determined at this time may result in softer sounding of vibration than the previous case, and thus the user can feel a different feedback effect in response to a varying force applied by himself or herself as if he or she was writing on paper by a real pencil at a varying strength. Moreover when the user hears low sounding of vibration, he or she can know his or her excessive force exerted currently and then may act more gently so as to avoid the touch input unit from being damaged.

In a second case, in the step 102, a feedback parameter of the force feedback unit can be determined based on the first parameter and a second parameter, where the second parameter is a parameter indicating the type of the touch input unit. Accordingly, in this embodiment, when an operation is performed on the touch input unit by the operating object, the second parameter indicating the type of the touch input unit is further obtained, and similar to the type of the operating object, the type of the touch input unit indicates what type of paper is currently emulated by the touch input unit, e.g., Kraft paper, art paper, etc., and in another example, 0 indicates Kraft paper, 1 indicates art paper, and 2 indicates writing paper.

Particularly the second parameter can also be stored in the electronic device. For example, the currently used type of the touch input unit may be set by assigning a value to a flag; and furthermore a user interface can be further provided via which the user can modify the value of the flag. The second parameter can be obtained particularly by inquiring the value of the flag set by the user on the mobile phone. For example, if the obtained second parameter is 0, then it is indicated that the currently set type of the touch input unit is Kraft paper.

In the step 101, the obtained first parameter is 0 indicating that the currently set type of the operating object is a pencil, and then the step 102 is performed to determine the feedback parameter of the force feedback unit based on both the first parameter and the second parameter, and with such a feedback parameter, the force feedback unit gives a feedback effect of rustling higher than rustling of writing paper because the real condition is similar where writing on Kraft paper by a pencil may sound higher than writing on writing paper. Hence, with the method in this embodiment, the user can feel differently as if he or she was writing on different types of paper by different types of pens, and thus a sense of real writing can also be perceived even with an electronic product, and the experience of the user is improved.

In a third case, the first case and the second case described above can be combined, that is, the type of the operating object, the type of the touch input unit and the pressure generated by the operating object on the touch input unit can be taken into account, and a particular implementation thereof may be similar to those in the first case and the second case, the description thereof will be omitted here.

With the method in this embodiment, a feedback effect can be determined based on both different types of the operating object and types of the touch input unit as well as on a strength of writing, so a more realistic feedback effect of writing can be brought to the user to improve the experience of the user.

Figure 2:
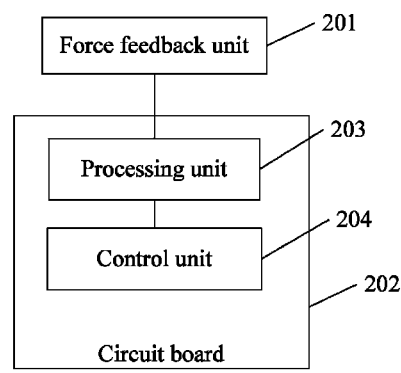
FIG. 2 is a functional block diagram of a haptic feedback apparatus in an embodiment of the invention.

Based on the same inventive idea, an embodiment of the invention further provides a haptic feedback apparatus configured to perform the method in FIG. 1 and the implementation thereof. The haptic feedback apparatus is arranged in an electronic device including a touch input unit configured to receive an operation performed on the touch input unit by an operating object. Referring to FIG. 2, the haptic feedback apparatus includes: a force feedback unit 201 arranged on the touch input unit; a circuit board 202; a processing unit 203 arranged on the circuit board 202, configured to obtain a first parameter indicating the type of the operating object upon reception of the operation and to determine a feedback parameter of the force feedback unit 201 at least based on the first parameter; and a control unit 204 arranged on the circuit board 202, configured to control the force feedback unit 201 based on the feedback parameter to generate and output to a user a feedback force corresponding to the type of the operating object.

Furthermore the haptic feedback apparatus further include a receiving unit connected to the circuit board 202 to receive first identification information transmitted from the operating object; and the processing unit 203 is further configured to obtain the first parameter based on the first identification information.

In a further embodiment, the haptic feedback apparatus further includes a pressure sensing means arranged on the touch input unit, configured to obtain first pressure information generated by the operating object on the touch input unit when performing the operation on the touch input unit; and the processing unit 203 is further configured to determine the feedback parameter of the force feedback unit 201 based on the first parameter and the first pressure information.

In another embodiment, the processing unit 203 is further configured to obtain a second parameter indicating the type of the touch input unit and to determine the feedback parameter of the force feedback unit based on the first parameter and the second parameter.

In another embodiment, the foregoing embodiments can be practiced in combination with each other, depending upon a practical condition.

The various variations and particular examples of the haptic feedback method in the foregoing embodiments can be equally applicable to the haptic feedback apparatus in this embodiment, and from the detailed description above of the haptic feedback method, those skilled in the art can appreciate clearly an implementation of the haptic feedback apparatus in this embodiment, so a detailed description thereof will be omitted here for conciseness of the description.

Furthermore, based on the same inventive idea, an embodiment of the invention further provides an electronic device including a touch input unit and the haptic feedback apparatus in FIG. 2 or the haptic feedback apparatus in the particular embodiments; of course, the electronic device can further include a display unit, a housing and other conventional elements, all of which are well known to those skilled in the art and the description thereof will be omitted here.

Figure 3:
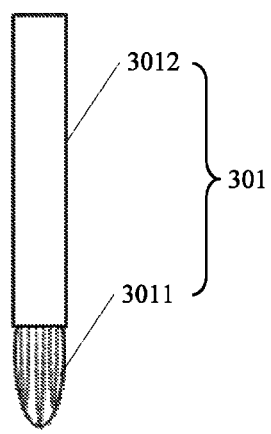
FIG. 3 is a structural diagram of a stylus in an embodiment of the invention.
Figure 4:
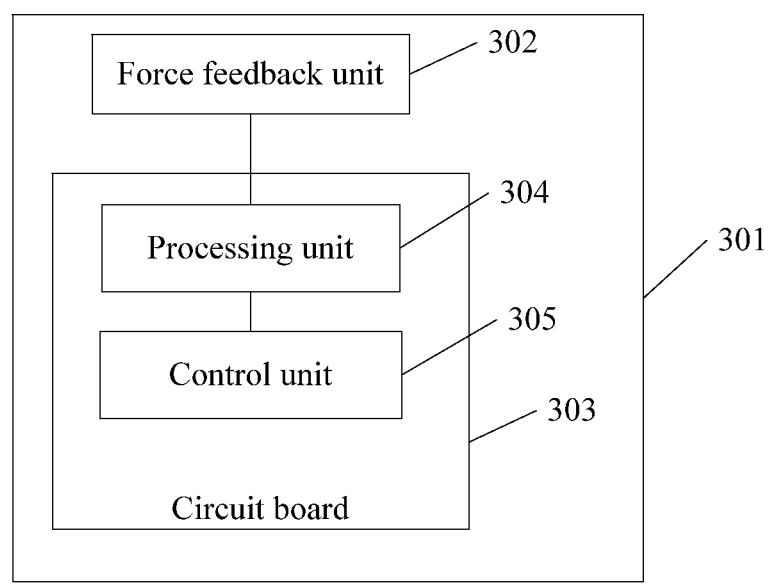
FIG. 4 is an architectural diagram a stylus in an embodiment of the invention.

Furthermore, based on the same inventive idea, a particular structure of a stylus according to an embodiment of the invention is described, in which the foregoing haptic feedback method is embodied. Referring to both FIG. 3 and FIG. 4, the stylus includes: a body 301 including a head 3011 and a stem 3012; a force feedback unit 302 arranged on the body 301; a circuit board 303 arranged on the body 301; a processing unit 304 arranged on the body 301, configured to obtain a first parameter indicating the type of the stylus when an operation is performed on the touch input unit by the head 3011 and to determine a feedback parameter of the force feedback unit 302 at least based on the first parameter; and a control unit 305 arranged on the circuit board 303, configured to control the force feedback unit 302 based on the feedback parameter to generate and output to a user a feedback force corresponding to the type of the stylus.

The force feedback unit 302 can be arranged on the head 3011 or can be arranged on the stem 3012, for example, typically at a place where the stylus is held by a hand, so that the user can perceive more directly the effect of a vibration feedback. Moreover the force feedback unit 302 can be a vibration motor or can be an ultrasonic vibration apparatus or can be a pneumatic apparatus, and of course, the force feedback unit 302 can alternatively be a force feedback unit of another type.

Similarly the circuit board 303, the processing unit 304 and the control unit 305 can also be arranged inside the head 3011 or can be arranged on the stem 3012. Generally there is a larger space on the stem 3012, and the circuit board 303, the processing unit 304 and the control unit 305 are preferably arranged on the stem 3012.

Furthermore the head 3011 can be arranged thereon with conductive rubber or conductive cotton through which the touch input unit is contacted for the input operation.

In an embodiment, the stylus further includes a pressure sensing means arranged on the body 301, configured to obtain first pressure information generated by the stylus on the touch input unit when the head 3011 performs the operation; and the processing unit 304 is further configured to determine the feedback parameter of the force feedback unit 302 based on the first parameter and the first pressure information. The pressure sensing means can be arranged on the head 3011 to determine the first pressure information by sensing the extent to which the conductive rubber or cotton is deformed, and of course, in another embodiment, the first pressure information can alternatively be sensed otherwise as well known to those skilled in the art, for which detailed description will be omitted here.

Furthermore in another embodiment, the processing unit 304 is further configured to obtain a second parameter transmitted from the electronic device, where the second parameter indicates the type of the touch input unit, and to determine the feedback parameter of the force feedback unit 302 based on the first parameter and the second parameter.

Furthermore the stylus further includes a switch configured to change the first parameter by changing the status of the switch. Particularly, for example, the switch is arranged with three levels, each of which indicates one type of the stylus. When the user shifts the switch to the first level, a flag in the stylus may be changed to a value of, for example, 0 indicating a pencil, and when the user shifts the switch to the second level, then the value of the flag may be changed to 1 indicating a fountain pen, and then the processing unit 304 can obtain the first parameter by fetching the value of the flag.

The foregoing embodiments can be practiced alone or in combination by those skilled in the art as required in practice.

The various variations and particular examples of the haptic feedback method in the foregoing embodiments can be equally applicable to the stylus in this embodiment, and from the detailed description above of the haptic feedback method, those skilled in the art can appreciate clearly an implementation of the stylus in this embodiment, so a detailed description thereof will be omitted here for conciseness of the description.

With one or more of the technical solutions in the embodiments of the invention, at least the following technical effects or advantages can be achieved.

In an embodiment of the invention, when an operation is performed on a touch input unit by an operating object, a first parameter indicating the type of the operating object is obtained, and then a feedback parameter of a force feedback unit is determined at least based on the first parameter, where the force feedback unit is arranged on the touch input unit or the operating object; and then the force feedback unit is controlled based on the feedback parameter to generate and output to a user a feedback force corresponding to the type of the operating object, so the method in this embodiment can given a different feedback effect in response to the type of the operating object. For example, if the first parameter indicates that the operating object is currently used in a pencil mode, that is, the current type of the operating object is a pencil, then a feedback parameter of the force feedback unit may be determined according to the pencil, and then the force feedback unit may generate and output to the user a feedback effect corresponding to the pencil, and at this time the user may feel as if he or she was writing with a real pencil, thus improving the experience of the user.

Furthermore in an embodiment of the invention, the feedback parameter of the force feedback unit is determined further based on a second parameter indicating the type of the touch input unit, and with the method in this embodiment, the feedback effect can be determined based on both the type of the operating object and the type of the touch input unit to be like writing on real paper by a real stylus, hence the method in this embodiment can further improve the experience of the user.

Still furthermore in an embodiment of the invention, the feedback effect can be further determined based on both pressure information generated by the operating object coming into contact with the touch input unit in the input operation and the first parameter indicating the type of the operating object, and even with the same type of stylus and the same type of paper, it may be felt differently with a varying strength, so with the method in this embodiment, the feedback effect can be determined based on both the type of the stylus and the pressure information to thereby further improve the experience of the user.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations fall into the scope of the appended claims and their equivalents.

The invention claimed is:

1. A haptic feedback method, applicable to an electronic device including a touch input unit, wherein the haptic feedback method comprises:
    when an operation is performed on the touch input unit by an operating object, obtaining a first parameter indicating a type of the operating object, wherein the type of the operating object is the type of the operating object itself or the type of the object emulated by the operating object;
    determining a feedback parameter of a force feedback unit at least based on the first parameter, wherein the force feedback unit is arranged on the touch input unit or arranged on the operating object; and
    controlling the force feedback unit based on the feedback parameter to generate and output to a user a feedback force corresponding to the type of the operating object.

2. The method according to claim 1, wherein obtaining a first parameter indicating a type of the operating object comprises:
    obtaining the first parameter by inquiring in the electronic device a value of a flag set by a user.

3. The method according to claim 1, wherein obtaining a first parameter indicating a type of the operating object comprises:
    receiving first identification information transmitted from the operating object; and
    obtaining the first parameter based on the first identification information.

4. The method according to claim 3, wherein the method further comprises:
    receiving a modification operation via a user interface; and
    modifying the first identification information in response to the modification operation.

5. The method according to claim 1, wherein determining a feedback parameter of a force feedback unit at least based on the first parameter comprises:
    determining the feedback parameter of the force feedback unit based on the first parameter and first pressure information, wherein the first pressure information is pressure information generated by the operating object coming into contact with the touch input unit when performing the operation.

6. The method according to claim 1, wherein determining a feedback parameter of a force feedback unit at least based on the first parameter comprises:
    determining the feedback parameter of the force feedback unit based on the first parameter and a second parameter, wherein the second parameter indicates the type of the touch input unit.

7. A haptic feedback apparatus, applicable to an electronic device including a touch input unit configured to receive an operation on the touch input unit by an operating object, wherein the haptic feedback apparatus comprises:
    a force feedback unit arranged on the touch input unit;
    a circuit board;
    a processing unit arranged on the circuit board, wherein the processing unit is configured to obtain a first parameter indicating a type of the operating object upon reception of the operation and to determine a feedback parameter of the force feedback unit at least based on the first parameter, wherein the type of the operating object is the type of the operating object itself or the type of the object emulated by the operating object; and
    a control unit arranged on the circuit board, wherein the control unit is configured to control the force feedback unit based on the feedback parameter to generate and output to a user a feedback force corresponding to the type of the operating object.

8. The haptic feedback apparatus according to claim 7, wherein the haptic feedback apparatus further comprises a receiving unit connected to the circuit board to receive first identification information transmitted from the operating object; and
    the processing unit is further configured to obtain the first parameter based on the first identification information.

9. The haptic feedback apparatus according to claim 7, wherein the haptic feedback apparatus further comprises a pressure sensing means arranged on the touch input unit, the pressure sensing means is configured to obtain first pressure information generated by the operating object on the touch input unit when obtaining the operation performed by the operating object; and the processing unit is further configured to determine the feedback parameter of the force feedback unit based on the first parameter and the first pressure information.

10. The haptic feedback apparatus according to claim 7, wherein the processing unit is further configured to obtain a second parameter indicating a type of the touch input unit and to determine the feedback parameter of the force feedback unit based on the first parameter and the second parameter.

11. An electronic device, comprising a touch input unit, wherein the electronic device further comprises the haptic feedback apparatus according to claim 7.

12. A stylus, configured to control an electronic device by performing an operation on a touch input unit, wherein the stylus comprises:
 a body comprising a head and a stem;
 a force feedback unit arranged on the body;
 a circuit board arranged on the body;
 a processing unit arranged on the body, wherein the processing unit is configured to obtain a first parameter indicating a type of the stylus when the operation is performed on the touch input unit by the head and to determine a feedback parameter of the force feedback unit at least based on the first parameter, wherein the type of the stylus is the type of the stylus itself or the type of object emulated by the stylus; and
 a control unit arranged on the circuit board, wherein the control unit is configured to control the force feedback unit based on the feedback parameter to generate and output to a user a feedback force corresponding to the type of the stylus.

13. The stylus according to claim 12, wherein the stylus further comprises a pressure sensing means arranged on the body, the pressure sensing means is configured to obtain first pressure information generated by the stylus on the touch input unit when the head performs the operation; and the processing unit is further configured to determine the feedback parameter of the force feedback unit based on the first parameter and the first pressure information.

14. The stylus according to claim 12, wherein the processing unit is further configured to obtain a second parameter transmitted from the electronic device and to determine the feedback parameter of the force feedback unit based on the first parameter and the second parameter, wherein the second parameter indicates a type of the touch input unit.

15. The stylus according to claim 12, wherein the stylus further comprises a switch configured to change the first parameter by changing a status of the switch.

* * * * *